Aug. 14, 1928.  
R. W. BROWN  
1,680,853  
MACHINE FOR CUTTING COMPOUND CURVES  
Original Filed Dec. 29, 1922  3 Sheets-Sheet 1

Inventor:  
Ray W. Brown.  
By G. S. Maynard  
Attorneys.

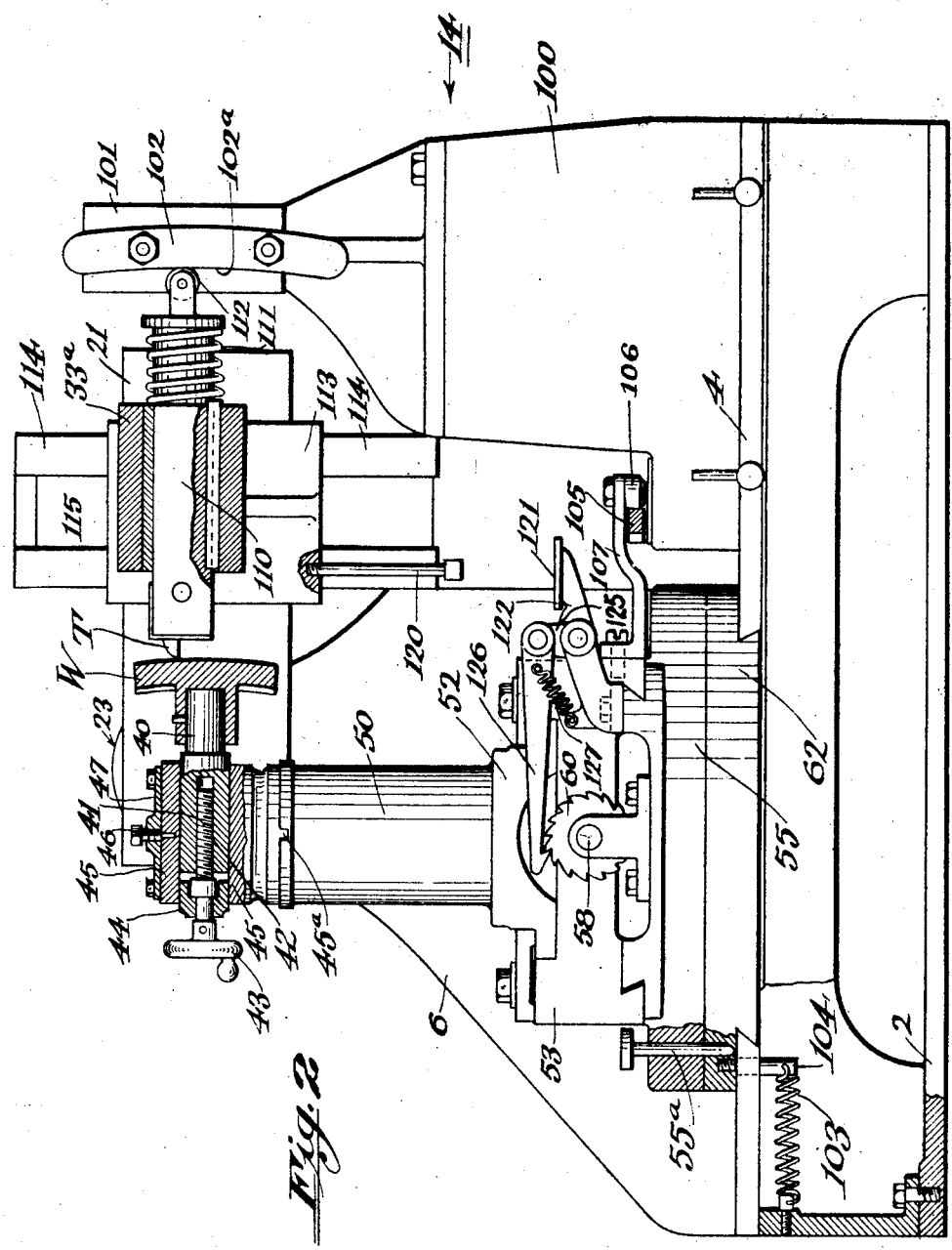

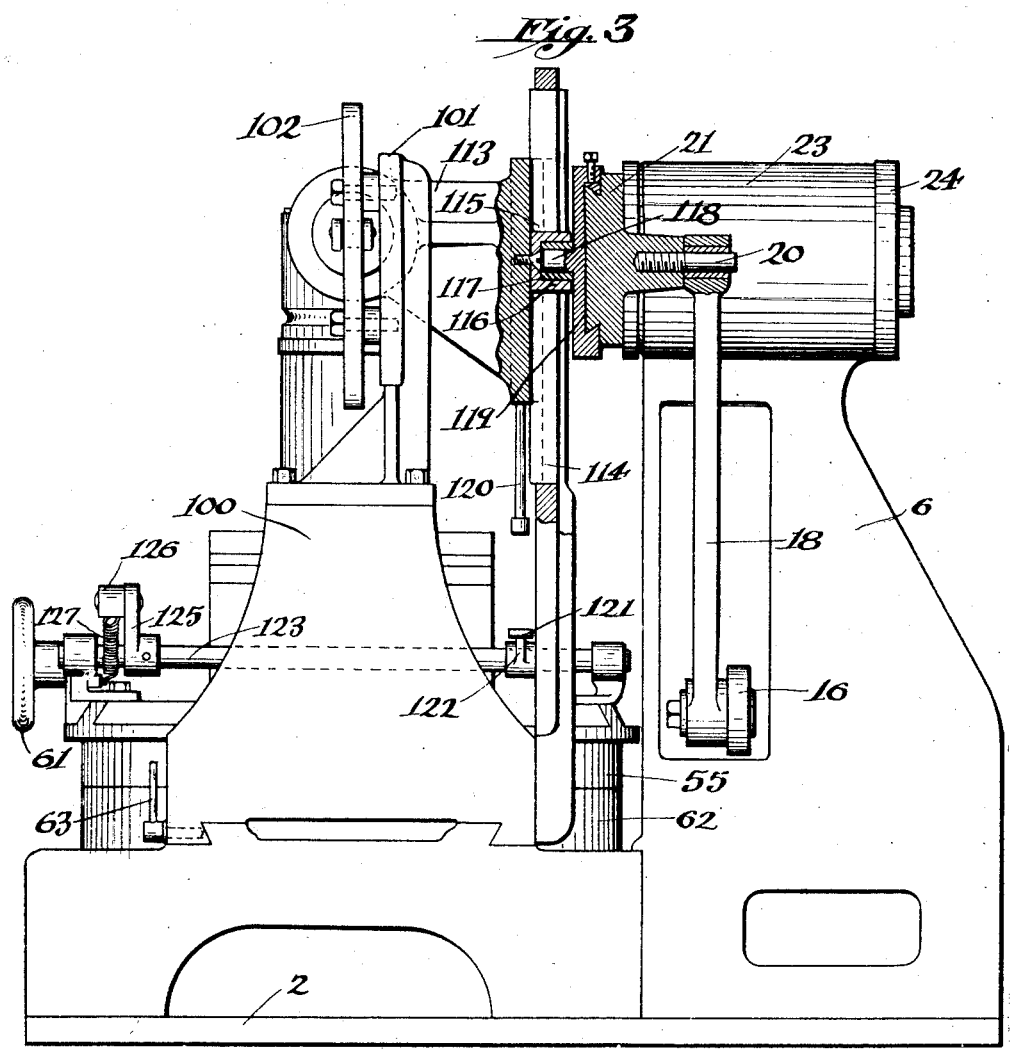

Patented Aug. 14, 1928.

1,680,853

UNITED STATES PATENT OFFICE.

RAY W. BROWN, OF LOS ANGELES, CALIFORNIA, ASSIGNOR TO BARNEY OLDFIELD MANUFACTURING COMPANY, OF LOS ANGELES, CALIFORNIA, A CORPORATION OF CALIFORNIA.

MACHINE FOR CUTTING COMPOUND CURVES.

Original application filed December 29, 1922, Serial No. 609,717. Divided and this application filed March 29, 1926. Serial No. 98,289.

This invention relates to the art of forming curved surfaces, and the present application is a division of application Ser. No. 609,717, filed Dec. 29, 1922, now Patent Number 1,580,006, of April 6, 1926, and reference is made to the specification thereof as to the general purpose of the type of machine forming the subject of invention herein disclosed.

An object of the invention is to provide a simple, substantial and practical machine for the accurate cutting of compound curved and other surfaces, and to provide for attachment and setting of templates for use in the cutting of different surfaces. While the machine may be efficient and useful in the cutting, for instance, of lens laps, its field of utility is unlimited in surface forming. To that end, various modifications, adaptations and embodiments may be resorted to within the spirit, scope and principle of the invention as it is here claimed.

In the drawings:

Figure 2 is a side elevation looking toward the carriage of the machine set up in Fig. 1; parts of the machine being in section.

Figure 3 is an end elevation of the machine looking in the direction of the arrow 14, Fig. 2, certain of the parts being in vertical section.

Figure 1:
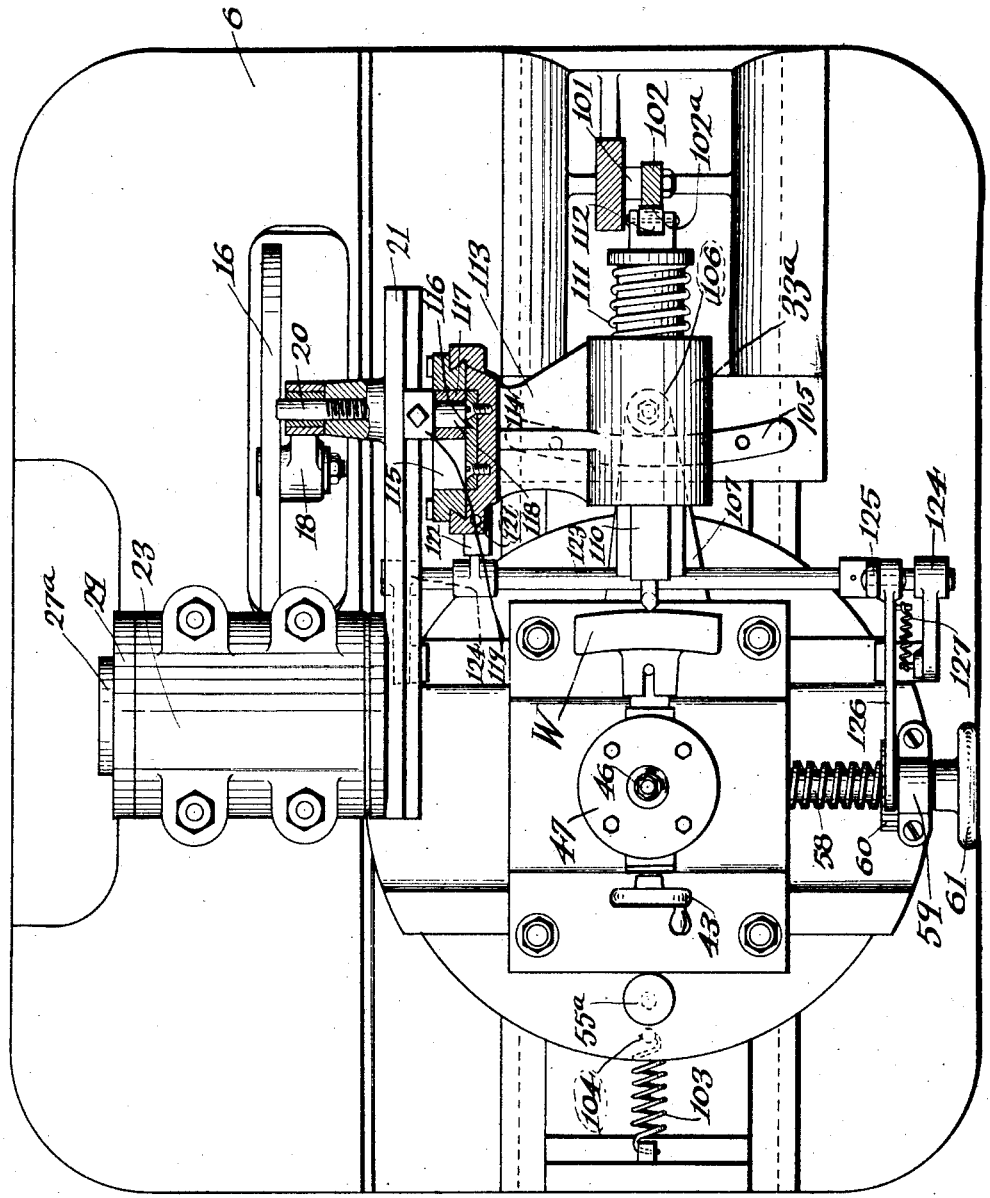
Figure 1 is a plan of the machine organized to operate upon work having a compound curved face of arcs of such radii as to require use of templates in the action of the machine.

The tool holder and the work holder of the said patent are designed to have a simple oscillatory motion and are capable of action up to limits of radial adjustment for curved cuts, about the centers of oscillation. In the present embodiment, instead of using simple oscillating work and tool holders these latter are so designed and constructed that templates may be employed to enable the cutting of surfaces of unlimited curve radius, and either simple or irregular.

In this arrangement a standard 100 is mounted on the guides 4 of the platform on the base 2 and this is provided with a face plate 101 to which there is adapted to be secured a prepared template 102 having an effective face 102$^a$ for determining the action of the tool T, Fig. 2, upon the work W which is held by the work post 50. The work post, with its base 52, is turned to stand at right angles to the guides 4, and the turret 55 is also turned at right angles to the guides 4 and is adapted to be locked or latched to the carriage 62 as by a locking pin 55$^a$. This presents the feed screw 58 transversely to the platform so that its ratchet wheel 60 is adapted to be automatically operated in the manner hereinafter described.

The carriage 62 is unlocked from or free on its guideways 4 and is yieldingly pulled in one direction, away from the standard 100 as by a substantial contractile spring 103 which is attached to a pin 104 secured to the carriage. The retracting effort of the spring 103 is resisted by a given template 105 secured to a portion of the base of the standard 100. The effective face of the template 105 is engaged by a roller 106 carried by the outer end of an arm 107 which is secured to the slide 53. The slide is transversely movable across the top of the turret 55 and this movement thereof is regulated by the action of the feed screw 58. The transverse path of movement of the slide 53 and the work post carried thereby will obviously be determined by the operative face of the template 105 which supports the roller 106 which is pulled against the template by the spring 103. If the effective face of the template 105 is convex, it will be seen that the carriage 62 will be pulled by the template toward the base of the standard 100, and then as the roller 106 passes over the crown of the convex face of the template 105, the carriage 62 will tend to recede. This movement of the carriage will be produced by the transverse movement of the slide 53 to which is attached the template engaging roller 106. The slide 53 has a transverse movement of its own on the locked turret 55 on carriage 62 and this transverse movement is combined with the longitudinal movement of the carriage 62 so that the work will be carried in a path determined absolutely by the contour of the template 105 that is engaged by the roller 106, and it is obvious that the operative face of the template 105 may be plane or curved with the curved face extending parallel to the axis of the roller 106.

The tool T in this embodiment is shown as mounted in a tool holder 33$^a$ for longitudinal reciprocation, the tool being secured in a sliding carrier 110 from one end of which the tool projects to engage the work, while the opposite end of the carrier 110 is surrounded by an expansion spring 111 serving to thrust a roller 112 provided on the end of the carrier 110 against the contiguous face of the template 102. The tool holder 33ª is provided with a rearwardly extending bracket 113 mounted for sliding movement on fixed guides 114 which forms a part of the standard 100. The fixed guide is provided with a clearance space 115 in which reciprocates a cross guide 116 formed upon or attached to the back of the bracket 113. The cross guide 116 slidingly receives a driving block 117 loosely mounted on a driving pin 118 which is carried by an adjustable pin-plate 119 adapted to be clamped at a desired position along the face of the drive arm 21. It will be seen that while the arm 21 is given an oscillatory movement, the drive pin 118 will also oscillate and will shift to and fro in the cross guide 116 which, therefore, is driven with a rectilinear movement and carries its bracket 113, in the present case vertically. This vertical movement of the bracket 113 reciprocates the tool holder 33ª vertically with the result that the roller 112 of the tool carrier 110 is run up and down the effective face of the template 102.

The combined movement of the tool carrier 110 as determined by the template 102 and the vertical movement of the tool holder 33ª results in giving to the tool T the desired movement to produce the requisite cut on the face of the work W. The tool scribes arcs in a vertical plane and the transverse curvature is effected by the travel of the slide 53 transversely as to the path of movement of the tool T.

To effect the automatic transverse feed of the slide 53 and the work W, suitable means are provided, in the present case shown as including a tappet pin 120 shown as attached to a lower portion of the bracket 113, and when the pin is in the lowermost position it is designed to engage an abutment 121 formed on or secured on the outer end of a lever arm 122 which is secured on a rock shaft 123 mounted in suitable bearings 124. On the outer end of the rock shaft 123 is secured a short upwardly extending lever arm 125 to which is connected a pawl 126 reaching over and engaging the ratchet wheel 60, Fig. 1. The pawl 126 is pulled into normal yielding engagement with the ratchet wheel as by a spring 127. In this organization of the invention, the work W is set for initial cut by moving the work post 50 to the front side of the machine and applying the requisite template 105 to engage the template roller 106 which regulates the action of the carriage 62. When the machine is started, the oscillations of the drive arm 21 serve to shift the tool in a vertical path which is differentiated in a horizontal direction by the template 102. As the drive arm 21 reciprocates, the tappet pin 120 becomes effective on the abutment 121 and the rock shaft 123 is oscillated with a consequent actuation of the feed shaft 58, with the result that the slide 53 is moved transversely across the machine and effects the advance of the work W during the intermittent action of the tool.

The arm 21 connects by a pin 20 to a link 18 which is operated by a lever 16 actuated by a motor concealed in the column 6.

In Fig. 3 is shown a locking device 63 to set the standard 100, and in Fig. 1 a handwheel 61 is shown to turn the feed screw 58 to back out the slide 53.

The lever arm 21 has a trunnion supported in bearing 23 which is closed at its outer end by a cap 29.

To adjust the work W there is a plug 40 receiving a screw 42, mounted in a collar 44 in a post head box 45, and having a hand wheel 43. A clamp plate 47, on top of the box, has a clamp screw 46 to bind down the plug 40. A tenon 45ª on the bottom of the box positions the box on the post 50.

What is claimed is:

1. In a machine for forming curved surfaces having curves in planes at right angles to each other, an oscillating arm, a stationary guide element, a tool holder mounted for reciprocation along said element by the said oscillating arm, and fixed means engageable by and for moving the tool holder in a line at right angles to and as a result of the reciprocating action and a work holder movable in a path transverse to the action of said tool holder, and automatically actuated by the latter.

2. In a machine for forming curved surfaces having curves in planes at right angles to each other, an oscillating arm, a stationary guide element, a tool holder and a slide therefor mounted for reciprocation along said element by the said oscillating arm, and fixed means engaging and for moving the tool holder on the slide in a line at right angles to the reciprocating action whereby to give to the tool a curved effective movement, said slide moving the holder along said means and a work holder movable in a path transverse to the action of said tool holder, and automatically actuated by the latter.

3. In a machine for forming curved surfaces having curves in planes at right angles to each other, an oscillating arm, a stationary guide element, a tool holder a slide, carrying said holder mounted for reciprocation along said element by the said oscillating arm, and means for moving the tool holder in the slide in a line at right angles to and concurrently with the reciprocating action, said means including a stationary template engaging and controlling movement of the tool holder during its reciprocations and a work holder movable in a path transverse of the action of said tool holder, and automatically actuated by the latter.

4. In a machine for forming curved surfaces having curves in planes at right angles to each other, an oscillating arm, a stationary guide element, a tool holder mounted for reciprocation engaging and along said element by the said oscillating arm, means for moving the tool holder in a line at right angles to the reciprocating action, a work holder for positioning work in a plane passing along the axis of oscillation of said arm, and means actuated by said tool holder for moving the work holder in a path transverse to the path of the operating tool holder.

5. In a machine for forming curved surfaces having curves in planes at right angles to each other, an oscillating arm, a stationary element, a tool holder mounted for reciprocation along said element, by the said oscillating arm, means for engaging and moving the tool holder in a line at right angles to the reciprocating action, a work holder for positioning work in a plane passing along the axis of oscillation of and operative intermittently with and by said arm, and means for engaging and moving the work holder in a curved path transverse to the path of the operating tool holder.

6. In a machine for forming curved surfaces having curves in planes at right angles to each other, an oscillating arm, a stationary element, a tool holder mounted for reciprocation along said element by the said oscillating arm, template means for engaging and moving the tool holder in a line at right angles to the reciprocating action, a work holder for positioning work in a plane passing along the axis of oscillation of said arm, and feed means for moving the work holder in a curved path transverse to the path of the operating tool holder, said means including a master template for engaging and imparting to the work holder the curved movement.

7. A reciprocating tool holder including a tool carrier permitting movement of the tool in a line at right angles to its reciprocating movement, and a master template for effecting the movement of the carrier in the tool holder, and an oscillating means for actuating the holder and a work holder operative by the carrier in a line at a right angle to that of the motion of the carrier.

8. A reciprocating tool holder including a tool carrier permitting movement of the tool in a line at right angles to its reciprocating movement, a master template for effecting and controlling the movement of the carrier in the tool holder by action of the holder in combination with a work holder for disposing work in the plane of operation of the tool carrier, and template controlled means for moving the work holder in a curved path transverse to the reciprocating movement of the tool holder.

9. A reciprocating tool holder including a tool carrier permitting movement of the tool in a line at right angles to its reciprocating movement, and a master template for controlling the movement of the carrier in the tool holder, in combination with a work holder for disposing work in the plane of operation of the tool, template controlled means for moving the work holder in a curved path transverse to the reciprocating movement of the tool holder, and automatically acting means controlled by the reciprocating tool holder for intermittently advancing the work holder to present successive lines of face to a tool in the carrier.

10. In a machine of the class described, a slidable work holding device and means for translating a rightline action thereof into a curved action, and a tool holder having a straight reciprocating motion and carrying a tool, and means for converting straight motion of the tool into a curved motion, and means cooperatively combining the said device and the tool holder and whereby the one controls the other.

11. In a machine of the class described, an oscillating arm, a stationary guide, a member slidably mounted on said guide, an operating connection between said arm and said member to translate curved motion to straight motion, a carrier part slidable in said member and a template to control said part, a work post and a cross feed support therefor, and template means for controlling the path of action of the post in coordination with the template controlled path.

RAY W. BROWN.